United States Patent
Okada et al.

(10) Patent No.: US 10,131,804 B2
(45) Date of Patent: *Nov. 20, 2018

(54) COATING COMPOSITION FOR FORMING A LUBRICATING LAYER THAT EXHIBITS IMPROVED SLIDING PROPERTY TO FLUID SUBSTANCES

(71) Applicant: Toyo Seikan Co., Ltd., Tokyo (JP)

(72) Inventors: Yoshiaki Okada, Yokohama (JP); Tomoyuki Miyazaki, Yokohama (JP); Keisuke Nyuu, Yokohama (JP)

(73) Assignee: Toyo Seikan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/320,124

(22) PCT Filed: Jun. 18, 2015

(86) PCT No.: PCT/JP2015/067576
§ 371 (c)(1),
(2) Date: Dec. 19, 2016

(87) PCT Pub. No.: WO2015/194626
PCT Pub. Date: Dec. 23, 2015

(65) Prior Publication Data
US 2017/0130155 A1    May 11, 2017

(30) Foreign Application Priority Data
Jun. 20, 2014   (JP) .................................. 2014-126877

(51) Int. Cl.
*C10M 165/00* (2006.01)
*C09D 7/40* (2018.01)
(Continued)

(52) U.S. Cl.
CPC ................. *C09D 7/69* (2018.01); *B05D 1/02* (2013.01); *B32B 5/16* (2013.01); *B32B 17/06* (2013.01);
(Continued)

(58) Field of Classification Search
CPC ............. C10M 101/04; C10M 159/06; C10M 2205/18; C10M 165/00; C10M 2207/401;
(Continued)

(56) References Cited

U.S. PATENT DOCUMENTS 5,037,564 A * 8/1991 Nishizaki ............ C09B 67/0086
508/450
8,535,779 B1  9/2013 Smith et al.
(Continued)

FOREIGN PATENT DOCUMENTS

EP    0332172 A1    9/1989
JP    63-265996 A   11/1988
(Continued)

OTHER PUBLICATIONS

King Arthur Flour, Standard Bread Loaf Pan, 8½"×4½", retrieved from the internet at <http://www.kingarthurflour.com.shop/items/bread-loaf-pan-8-x-4-standard> on Sep. 27, 2017.*
(Continued)

*Primary Examiner* — James C Goloboy
(74) *Attorney, Agent, or Firm* — Sughrue Mion, PLLC

(57) ABSTRACT

A coating composition for forming a lubricating layer (3) on the surface of a base material (1) formed in a predetermined shape so as to exhibit improved sliding property to fluid substances, the coating composition containing, as a dispersion medium, a liquid (5) that is a component constituting the lubricating layer (3), and the dispersion medium containing solid particles (7) dispersed therein as a component constituting the lubricating layer (3). The lubricating layer
(Continued)

(3) formed by using the coating composition exhibits more improved sliding property to fluid substances. The coating composition, therefore, can be favorably used for forming the lubricating layer (3) on the inner surfaces of the packing materials such as containers and lids.

5 Claims, 2 Drawing Sheets

(51) Int. Cl.
| | |
|---|---|
| C10M 101/04 | (2006.01) |
| C10M 145/40 | (2006.01) |
| B65D 1/02 | (2006.01) |
| B65D 23/02 | (2006.01) |
| B65D 5/00 | (2006.01) |
| B32B 17/06 | (2006.01) |
| B32B 27/06 | (2006.01) |
| B32B 33/00 | (2006.01) |
| C09D 201/00 | (2006.01) |
| B05D 1/02 | (2006.01) |
| B32B 5/16 | (2006.01) |
| C09D 7/65 | (2018.01) |
| C09D 5/00 | (2006.01) |
| C09D 191/00 | (2006.01) |
| C10M 159/06 | (2006.01) |

(52) U.S. Cl.
CPC .............. *B32B 27/06* (2013.01); *B32B 33/00* (2013.01); *B65D 1/0223* (2013.01); *B65D 23/02* (2013.01); *C09D 5/00* (2013.01); *C09D 7/40* (2018.01); *C09D 7/65* (2018.01); *C09D 191/00* (2013.01); *C09D 201/00* (2013.01); *C10M 159/06* (2013.01); *C10M 165/00* (2013.01); *B32B 2264/00* (2013.01); *B32B 2439/00* (2013.01); *C10M 2205/18* (2013.01); *C10M 2207/401* (2013.01); *C10M 2209/12* (2013.01); *C10N 2220/082* (2013.01); *C10N 2250/121* (2013.01)

(58) Field of Classification Search
CPC ......... C10M 2209/12; C10N 2220/082; C10N 2250/121; C09D 5/007; C09D 7/40; C09D 7/65; C09D 7/69; C09D 191/00; C09D 201/00; B05D 1/02; B32B 5/16; B32B 17/06; B32B 27/06; B32B 33/00; B32B 2264/00; B32B 2439/00; B65D 1/02
See application file for complete search history.

(56) References Cited

U.S. PATENT DOCUMENTS

| | | | |
|---|---|---|---|
| 2005/0197260 A1* | 9/2005 | Johnson | ............... C10M 169/02 508/216 |
| 2011/0045188 A1* | 2/2011 | Rau | ...................... C10M 111/04 427/301 |
| 2012/0118886 A1 | 5/2012 | Sekiguchi et al. | |
| 2014/0116465 A1 | 5/2014 | Fang | |
| 2015/0017334 A1 | 1/2015 | Sekiguchi et al. | |

FOREIGN PATENT DOCUMENTS

| | | | |
|---|---|---|---|
| JP | 4-72392 A | | 3/1992 |
| JP | 5-263092 A | | 10/1993 |
| JP | 5-320677 A | | 12/1993 |
| JP | 6-41570 A | | 2/1994 |
| JP | 2005-75912 A | | 3/2005 |
| JP | 2008-237188 A | | 10/2008 |
| JP | 2010-254377 A | | 11/2010 |
| JP | 2011-130712 A | | 7/2011 |
| JP | 2011130712 A | * | 7/2011 |
| WO | 2012/100099 A2 | | 7/2012 |
| WO | 2013/022467 A2 | | 2/2013 |

OTHER PUBLICATIONS

International Search Report for PCT/JP2015/067576 dated Sep. 29, 2015 [PCT/ISA/210].
Communication dated Nov. 22, 2017 from the European Patent Office in counterpart European application No. 15809491.2.

* cited by examiner

COATING COMPOSITION FOR FORMING A LUBRICATING LAYER THAT EXHIBITS IMPROVED SLIDING PROPERTY TO FLUID SUBSTANCES

CROSS REFERENCE TO RELATED APPLICATIONS

This application is a National Stage of International Application No. PCT/PCT/JP2015/067576, filed on Jun. 18, 2015, which claims priority from Japanese Patent Application No. 2014-126877, filed on Jun. 20, 2014, the contents of all of which are incorporated herein by reference in their entirety.

TECHNICAL FIELD

This invention relates to a coating composition for forming a lubricating layer on the surface of a base material formed in a predetermined shape so as to exhibit improved sliding property to fluid substances.

BACKGROUND ART

The containers for containing liquid contents must be capable of favorably discharging the contents irrespective of the materials forming the containers. Discharging the content is not almost of a problem when the liquids having low viscosity such as water and the like are contained. Discharging the content, however, becomes a serious problem when the content is a highly viscous substance such as mayonnaise or ketchup irrespective of the plastic container or the glass container. Namely, the contents of this kind are not quickly discharged despite the container is tilted. Besides, the contents tend to stay on the container wall and cannot be all recovere. Particularly, the content stays in considerable amounts on the bottom of the container and is not all recovered.

In recent years, there have been proposed various kinds of technical arts for improving sliding properties to viscous substances by forming a liquid film on the surface of a base material. (e.g., see patent documents 1 and 2).

According to the above technical arts, the sliding property can be strikingly improved as compared to the cases of adding an additive such as lubricant to the synthetic resin that forms the surface of the base material, and attention has now been paid thereto.

Here, even according to means for improving surface properties by forming the liquid film on the surface of the base material as described above, it is not still possible to effectively prevent the content from adhering on the bottom of the container. Therefore, it has been desired to further improve the sliding property.

There has, further, been proposed a container with fine particles of a hydrophobic oxide adhered on the inner surface thereof and featuring excellent non-adhering property (patent document 3).

However, the sliding property expressed by the above container is very weaker than that expressed by the container provided with the liquid film.

Besides, improving the sliding property to the above-mentioned fluid substances has been desired not only for the containers but also for the lid materials and for the members such as pipes for flowing viscous fluid substances.

PRIOR ART DOCUMENTS

Patent Documents

Patent document 1: WO2012/100099
Patent document 2: WO2013/022467
Patent document 3: JP-A 2010-254377

OUTLINE OF THE INVENTION

Problems that the Invention is to Solve

It is, therefore, an object of the present invention to provide a coating composition capable of forming a lubricating layer on the surface of a base material formed in a predetermined shape so as to exhibit improved sliding property to the viscous fluid substances.

Another object of the present invention is to provide a method of forming a lubricating layer on the surface of a base material used as a packing material such as containers and lids.

Means for Solving the Problems

According to the present invention, there is provided a coating composition for forming a lubricating layer on the surface of a base material formed in a predetermined shape so as to exhibit improved sliding property to fluid substances, the coating composition containing, as a dispersion medium, a liquid that is a component constituting the lubricating layer, and the dispersion medium containing solid particles dispersed therein as a component constituting the lubricating layer.

In the coating composition of the present invention, it is desired that:

(1) The liquid serving as the dispersion medium is a high-boiling liquid that has a boiling point of not lower than 200° C., acquires an angle of contact (20° C.) of not more than 45° relative to the surface of the base material and has a viscosity (25° C.) of not more than 100 mPa·s;
(2) The solid particles are dispersed in an amount of 0.01 to 20 parts by mass per 100 parts by mass of the liquid that is the dispersion medium;
(3) The solid particles have a particle size of 5 to 300 μm; and
(4) The solid particles are organic particles.

According to the present invention, further, there is provided a method of forming a lubricating layer on the surface of the base material so as to exhibit improved sliding property to fluid substances by spraying the coating composition onto the surface of the base material in an amount of 1.0 to 6.2 mg/cm².

In the above method, it is desired that a packing material is used as the base material for containing a fluid substance, and the coating composition is sprayed onto the surface of the packing material with which the fluid substance comes in contact.

According to the present invention there is, further, provided a structure having a lubricating layer formed on the surface of the base material by applying the coating composition thereon so as to exhibit improved sliding property to fluid substances, the lubricating layer being formed of a liquid and solid particles.

Effects of the Invention

The coating composition of the present invention assumes the form of a suspension comprising a liquid as a dispersion medium in which solid particles are dispersed. By applying the coating composition onto the surface of the base material formed in a predetermined shape, there is formed a lubricating layer that exhibits improved sliding property to the fluid substances.

In the coating composition, the liquid which is the dispersion medium is a component which, together with the solid particles dispersed in the composition (suspension) constitutes the lubricating layer that is formed. The liquid cannot be removed by heating or the like method. Therefore, the layer of the coating composition formed by being applied on the surface of the base material serves in its form as a lubricating layer without the need of effecting the after treatment such as heating or the like, and offers a great advantage of the present invention.

The lubricating layer formed by using the coating composition of the present invention comprises the liquid used as the dispersion medium in the coating composition and the solid particles suspended and dispersed in the coating composition. The lubricating layer of such a structure exhibits excellent sliding property to the fluid substances and also exhibits excellent sliding property to viscous fluid substances having viscosities of not less than 1260 mPa·s, such as mayonnaise, ketchup, aqueous paste, honey, a variety of kinds of sauces, mustard, dressing, jam, chocolate syrup, cosmetic liquids such as milky lotion, etc., liquid detergent, shampoo, rinse, etc.

Therefore, the coating composition of the invention can be preferably used as means for forming a lubricating layer on the surface (with which the content comes in contact) of a packing material (e.g., container or lid) that contains the above-mentioned viscous substances.

BRIEF DESCRIPTION OF THE DRAWINGS

FIGS. 3A and 3B are views illustrating the state of solid particles present in the coating composition, wherein FIG. 3A is a model view of the lubricating layer of when the solid particles are contained much and FIG. 3B is a model view of the lubricating layer of when the solid particles are contained less.

MODES FOR CARRYING OUT THE INVENTION

The coating composition of the present invention comprises liquid used as the dispersion medium and solid particles dispersed in the liquid. The liquid and the solid particles are both the components that constitute the lubricating layer that is formed by applying the coating composition on the surface of a predetermined base material.

Figure 1:
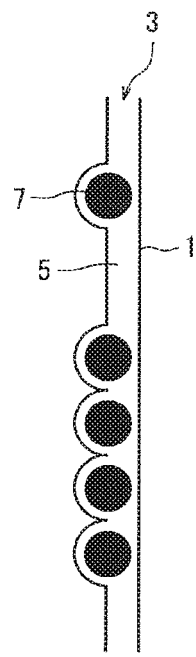
FIG. 1 is a model view illustrating the state of a lubricating layer formed on the surface of a base material by using a coating composition of the present invention.

Referring to FIG. 1, a lubricating layer 3 is formed by applying the coating composition of the present invention onto a surface 1 of a base material 1 that comes in contact with a fluid substance, and contains a liquid 5 and solid particles 7. The liquid 3 serves as a dispersion medium in the coating composition and the solid particles 7 are the particles dispersed in the coating composition.

As will be learned from the drawing, the structure in which the solid particles 7 are dispersed in the coating composition is directly reflected in the lubricating layer 3 which comes into direct contact with the fluid substance that flows on the surface 1 and which, therefore, exhibits excellent sliding property to the fluid substance. That is, the sliding property is greatly improved as compared to when the fluid substance flows directly on the surface 1.

It has been known already that the sliding property to the content improves if a film of a liquid is formed on the surface of a packing material such as container. If a viscous content is to be discharged from the packing material (e.g., container) having the above liquid film formed on the inner surface thereof, then the content is discharged from the packing material in liquid-liquid contact. That is, the content flows down along the inner surface of the packing material not in solid-liquid contact but in liquid-liquid contact. Therefore, if an oily liquid is used that is immiscible with the content, then the sliding property can be improved to an aqueous substance that contains water. Further, if an aqueous liquid is used that is immiscible with the content, then the sliding property can be improved to an oily substance.

Here, the lubricating layer 3 formed by using the coating composition of the invention has a structure in which the solid particles 7 are dispersed in the liquid 5 and, therefore, exhibits further improved sliding property to the fluid substance (e.g., to the content in the container) than when the liquid is formed by using the liquid 5 only.

For example, as demonstrated in Experimental Examples appearing later, if Experimental Example 18 (Comparative Example) that is forming the lubricating layer of a liquid paraffin (liquid film in which no solid particle is dispersed) on the surface of a polypropylene sheet is compared with Experimental Example 1 (this invention) that is forming the lubricating layer by using the coating composition comprising the liquid paraffin (liquid 5) in which the rice wax (solid particles 7) is dispersed in regard to the slide-down velocity of a mayonnaise-like food (for detailed conditions, refer to Examples), the mayonnaise-like food is sliding down more quickly in Experimental Example 1.

As described above, the sliding property to the fluid substance further improves when the lubricating layer 3 comprising the liquid 5 in which the solid particles 7 are present is formed by using the coating composition of the present invention because of the reasons which the present inventors presume as described below.

Namely, if the fluid substance (e.g., the content in the packing material such as container) falls down in contact with the lubricating layer 3, the solid particles 7 serve as rollers and fall down rolling together with the fluid substance. It is, therefore, considered that the sliding property is further improved than when the liquid (liquid layer) is simply formed by using the liquid 5. In fact, in Experimental Example 19 in which the layer of the liquid 5 (edible oil) is formed in a state where the solid particles 7 are adhered to the surface of the base material 1, the sliding Property to the fluid substance is poorer than that of Experimental Example 1 mentioned above. This is because, in this case, the solid particles 7 are fixed on the surface of the base material 1 and do not serve as rollers.

If used, specifically, as a container such as bottle, the structure in which the lubricating layer 3 is formed on the surface of the base material 1 by using the coating composition of the invention works to greatly suppress the content from adhering and remaining on the bottom portion in addition to exhibiting improved sliding property to the content.

For instance, in Experimental Examples appearing later, the bottles forming the lubricating layer 3 on the inner surfaces thereof are filled with a mayonnaise-like food (viscosity: 1260 mPa·s@25° C.) as the content, and adhesion and stay of the content on the bottom portions are evaluated. In the bottles in which the solid particles are dispersed in the lubricating layer formed on the inner surfaces according to the present invention, it is learned from the results of the tests that the mayonnaise-like food has been greatly suppressed from adhering and staying therein.

As for the reason why the content is effectively suppressed from adhering or remaining on the bottom portion, the present inventors consider that even after the content has slipped down, the solid particles 7 are still held on the surface of the base material 1 in a state of holding the liquid 5, and the liquid 5 held on the surfaces of the solid particles 7 is made present on the bottom portion of the container. That is, in case the lubricating layer (simple liquid film) is formed containing no fine solid particle 7 dispersed therein, if the container is inverted or is tilted, the liquid 5 splits away from the surface of the base material (inner surface of the container) due to its own weight. As a result, the sliding property to the content greatly decreases on the bottom portion. By forming the lubricating layer 3 by using the coating composition of the present invention, however, the liquid 5 is firmly held on the surface of the base material 1 (on the inner surface of the container) due to the solid particles 7 and, as a result, the sliding property is stably exhibited in the bottom portion, too.

Further, if the container is inverted or tilted to discharge the content out of the container, the container being the most preferred embodiment of the structure forming the lubricating layer 3 of the coating composition of the present invention on the surface of the base material 1, then part of the liquid 5 and part of the solid particles 7 fall down and are discharged together with the content. If the container is returned back to the erected state, however, the solid particles 7 holding the liquid 5 on the surfaces thereof less tend to slip down than the content. Namely, the solid particles 7 stay on the bottom portion of the container and work again to exhibit excellent sliding property when the content is discharged next time.

With the lubricating layer 3 being formed on the inner surface of the base material 1 or the container by selecting a suitable kind of liquid (liquid 5 in the lubricating layer 3) used as the dispersion medium in the coating composition and selecting a suitable kind of solid particles (solid particles 7 in the lubricating layer 3) that are to be dispersed in the coating composition, the container can be favorably used for containing viscous contents that could not be smoothly discharged so far. Specifically, the base material 1 of the present invention can be most favorably used as a container for containing the contents having viscosities (25° C.) of not less than 1260 mPa·s, such as mayonnaise, ketchup and a variety of kinds of dressings.

<Surface of the Base Material and Form of the Base Material>

Referring to FIG. 1, no particular limitation is imposed on the surface of the base material 1 on which the lubricating layer 3 is formed by using the coating composition of the present invention if it is capable of holding the liquid 5 and the solid particles 7 which are the components constituting the lubricating layer 3 and, at the same time, if it can be formed to meet the use. Namely, the surface of the base material 1 may be made of a synthetic resin, a glass or a metal. That is, the base material 1 having the above-mentioned surface is favorably used as a packing material and a pipe for flowing viscous fluid substances. Specifically, the packing material may be a synthetic resin container, a glass container, a metal container, or may be a lid made of a synthetic resin used for sealing the mouth portion of a container or may be a pouring fitting made of a synthetic resin used for pouring the content out of the container.

When the structure is used as a container, in particular, it is desired that the present invention is adopted to a container of which the inner surface is formed of a synthetic resin or glass and, specifically, of which the inner surface is formed of the synthetic resin that has heretofore been used for containing viscous contents. This is because the viscous content is allowed to be easily discharged. Therefore, the material forming the surface of the base material 1 (e.g., inner surface of the packing material) is, most desirably, a synthetic resin.

The synthetic resin desirable as a material for forming the surface of the base material 1 (hereinafter called underlying resin) may be any thermoplastic resin or thermosetting resin that can be formed. Usually, however, a thermoplastic resin is preferred from such a standpoint that it can be easily formed and that it is capable of stably holding an oily liquid (liquid 5) and the solid particles 7 that also hold the oily liquid on the surfaces thereof.

As the thermoplastic resin, there can be exemplified the following resins; i.e., olefin resins such as low-density polyethylene, high-density polyethylene, polypropylene, poly (1-butene), poly (4-methyl-1-pentene), and random or block copolymers of α-olefins such as ethylene, propylene, 1-butene or 4-methyl-1-pentene, and cyclic olefin copolymers thereof;

ethylene-vinyl copolymers such as ethylene-vinyl acetate copolymer, ethylene-vinyl alcohol copolymer and ethylene-vinyl chloride copolymer;

styrene resins such as polystyrene, acrylonitrile styrene copolymer, ABS and α-methylstyrene styrene copolymer;

vinyl resins such as polyvinyl chloride, polyvinylidene chloride, vinyl chloride vinylidene chloride copolymer, poly (methyl acrylate) and poly(methyl methacrylate);

polyamide resins such as nylon 6, nylon 6-6, nylon 6-10, nylon 11 and nylon 12;

polyester resins such as polyethylene terephthalate (PET), polybutylene terephthalate, polyethylene naphthalate and copolymerized polyesters thereof;

polycarbonate resin;

polyphenylene oxide resin; and biodegradable resins such as polylactic acid and the like.

As a matter of course, it is also allowable to use a blend of the above thermoplastic resins as the underlying resin so far as it does not impair the formability.

In the invention, among the above thermoplastic resins, it is desired to use an olefin resin and a polyester resin that have been used as materials of containers for containing viscous contents, and it is most desired to use the olefin resin.

That is, as compared to the polyester resin such as PET, the olefin resin has a low glass transition temperature (Tg) and shows a high molecular mobility at room temperature. When lubricating layer 3 containing the oily liquid such as edible oil is formed on the surface of the base material 1, therefore, the oily liquid partly infiltrates into the interior thereof. As a result, the base material 1 stably holds the lubricating layer 3 (liquid 5 and the solid particles 7 that also hold the liquid 5 on the surfaces thereof)

Besides, the olefin resin is highly flexible and is also used for directly blow-forming the containers that can be squeezed (squeezable bottles). Therefore, the olefin resin is suitably used even from the standpoint of adopting the structure in which the lubricating layer 3 is formed on the surface of the base material 1 to the containers of the above-mentioned type.

There is no limitation on the base material 1 having the above-mentioned surface structure provided the lubricating layer 3 can be formed on the surface thereof by using the coating composition of the present invention. Namely, the base material 1 can assume a variety of forms depending on the use, such as pipe, container, lid and the like.

Specifically, the base material 1 and the structure having the lubricating layer 3 on the surface thereof are favorably adopted to the packing materials and are favorably used in the form of, for example, synthetic resin container, glass container, metal container, as well as lid and pouring fitting (spout).

Further, in the case of a container having an inner surface made of a synthetic resin, the base material 1 may be a single-layer structure with which the whole container is formed using the synthetic resin that forms the inner surface thereof, or may be a laminated-layer structure including layers of other synthetic resins.

Specifically, when the inner surface is formed of an olefin resin or a polyester resin, there can be employed a multi-layer structure including an oxygen-barrier layer or an oxygen-absorbing layer laminated via a suitable adhesive resin layer as an intermediate layer and, further, including, on the outer surface side, a layer of the same resin as the underlying resin (olefin resin or polyester resin) that is forming the inner surface.

The oxygen-barrier layer in the multi-layer structure is formed of an oxygen-barrier resin such as ethylene-vinyl alcohol copolymer or polyamide, and the oxygen-barrier resin may be, further, blended with other thermoplastic resins so far as the oxygen-barrier property is not impaired.

As described in JP-A-2002-240813 and the like, the oxygen-absorbing layer includes an oxidizable polymer and a transition metal catalyst. Due to the action of the transition metal catalyst, the oxidizable polymer is oxidized with oxygen; i.e., oxygen is absorbed and permeation of oxygen is shut off. The oxidizable polymer and the transition metal catalyst have been closely described in the above JP-A-2002-240813 and are not described here in detail. If described, however, representative examples of the oxidizable polymer are olefin resins having tertiary carbon atoms (e.g., polypropylene, polybutene-1, or copolymers thereof), thermoplastic polyester, aliphatic polyamide; xylene group-containing polyamide resin; and ethylenically unsaturated group-containing polymers (e.g., polymers derived from polyene, such as butadiene, etc.). As the transition metal catalyst, there can be exemplified inorganic salts of transition metals such as iron, cobalt, nickel, etc., organic acid salts thereof and complexes thereof.

Adhesive resins used for adhering the layers have been known per se, and examples thereof include olefin resins graft-modified with a carboxylic acid such as maleic acid, itaconic acid or fumaric acid or with an anhydride thereof, or with an amide or ester; ethylene-acrylic acid copolymer; ionically crosslinked olefin copolymer; and ethylene-vinyl acetate copolymer.

Thicknesses of the above layers may be suitably set depending on the properties required for the layers.

It is, further, allowable to provide, as an inner layer, a reground resin layer using a blend of a virgin resin such as olefin resin and scraps such as burr generated during the formation of the base material 1 of the above-mentioned multi-layer structure. Or in the container forming the inner surface (surface of the above-mentioned base material 1) using the olefin resin or the polyester resin, it is also allowable, as a matter of course, to form an outer surface thereof using the polyester resin or the olefin resin.

There is no specific limitation on the shape of the container, either. Namely, the container may assume the form depending on the material forming the container, such as cup, bottle, bag (pouch), syringe, pot, tray, etc., and may have been stretched.

Specifically, in the case of a synthetic resin container, a preform having the inner surface is formed by a method known per se., is subjected to the after-treatments such as sticking a film thereto by heat-sealing and vacuum forming such as plug assist forming or blow-forming to form a container.

Figure 2:
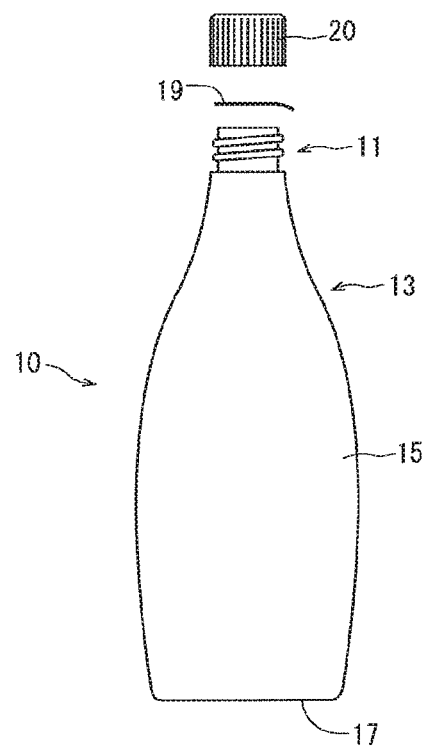
FIG. 2 is a view showing a directly blow-formed bottle which is a preferred embodiment of the base material provided with the lubricating layer formed by using the coating composition of the present invention.

FIG. 2 shows a directly blow-formed bottle which is the most preferred embodiment of the base material 1 of the present invention.

In FIG. 2, the bottle generally designated at 10 includes a neck portion 11 having a screw thread, a body wall 15 continuous to the neck portion 11 via a shoulder portion 13, and a bottom wall 17 that is closing the lower end of the body wall 15. The above-mentioned liquid film is formed on the inner surface of the bottle 10 which is filled with, for example, a viscous content.

<Coating Composition>

The coating composition of the present invention is used for forming the lubricating layer 3 on the surface of the base material 1. The liquid 5 in the lubricating layer 3 serves as the dispersion medium while the solid particles 7 are dispersed in the lubricating layer 3.

Therefore, the liquid 5 used as the dispersion medium is suitably selected depending on the object (e.g., content in the packing material) to which the sliding property is exhibited by the base material 1.

The liquid 5 is not the one that is to be removed after the coating composition is applied, and the layer that is applied serves in its form as the lubricating layer 3. Therefore, the liquid 5, as a matter of course, must be a nonvolatile liquid having a small vapor pressure under atmospheric pressure, such as a high-boiling liquid having a boiling point of not lower than 200° C. This is because if the volatile liquid is used, the liquid easily volatilizes and extinguishes with the passage of time making it difficult to form the lubricating layer 3.

Moreover, the liquid 5 should have a high boiling point as described above and should, further, be immiscible with the fluid substance that flows on the surface 1. Further, it is desired that the liquid 5 is highly wettable for the surface 1 and is capable of forming the lubricating layer 3 evenly on the surface 1. From these points of view, therefore, it is desired that the liquid 5 acquires an angle of contact (20° C.) of, desirably, not more than 45 degrees with respect to the surface 1 and has a viscosity (25° C.) of not more than 100 mPa·s. Namely, it is allowed to use the liquid 5 that satisfies the above-mentioned properties irrespective of if the material forming the surface of the base material 1 is a synthetic resin, a glass or a metal.

Further, as for the liquid 5 that satisfies the above-mentioned properties, a liquid exhibits a high lubricating effect if it has a surface tension greatly different from that of the substance (e.g., content in the container) that is to slip down; i.e., the liquid of this kind is suited for the present invention.

For example, to improve the sliding property to water or a hydrophilic substance that contains water, it is desired to use, as the liquid 5, an oily liquid having a surface tension lying in a range of 10 to 40 mN/m and, specifically, 16 to 35 mN/m. Representative examples are liquid paraffin, synthetic paraffin, fluorine-contained liquid, fluorine-contained surfactant, silicone oil, fatty acid triglyceride and various plant oils. As the plant oils, there can be preferably used soy bean oil, rape oil, olive oil, rice oil, corn oil, safflower oil, sesame oil, palm oil, castor oil, avocado oil, coconut oil, almond oil, walnut oil, hazel oil and salad oil.

In the coating composition of the present invention, the solid particles dispersed in the liquid 5 (dispersion medium) do not dissolve therein, i.e., the solid particles 7 in the lubricating layer 3 do not dissolve in the liquid 5 but are present therein in a solid form. The solid particles 7 do not, either, dissolve in a fluid substance (e.g., content in the container) that flows on the surface of the structure that has the lubricating layer 3 formed on the surface of the base material 1. Here, it is desired that the solid particles are fine particles having a particle size (median value of particles) of not more than 300 μm and, preferably, not more than 100 μm. If the particle size is too large, the particles may fail to roll to a sufficient degree and may fail to exhibit the effect of improving the sliding property to a sufficient degree. It is, further, desired that the particle size is not less than 5 μm from such a viewpoint that the particles are homogeneously dispersed in the lubricating layer 3 (liquid 5) without being aggregated.

Further, the solid particles 7 must remain in the solid state when the structure is being used for exhibiting the sliding property of the lubricating layer 3. It is, therefore, desired that the solid particles have a melting point of not lower than 40 degrees.

There is no specific limitation on the material of the solid particles 7 which, therefore, may be formed by using any kind of organic material or inorganic material. From the standpoint of being held on the surface of the base material 1 and affinity to the liquid 5 present in the lubricating layer 3, however, it is desired that the solid particles 7 are rather organic particles than inorganic particles such as metal particles or metal oxide particles. Desirably, the particles are formed of, for example, olefin wax, rice wax, carnauba wax, various celluloses and cured organic resin (e.g., cured product obtained by curing a polyfunctional acrylic monomer). Specifically, the rice wax and the like are desired from such a standpoint that they Can be used for the contents that are foods without limitation.

The coating composition of the present invention is such that when it is applied onto the surface of the base material 1, the applied layer in its form serves as the lubricating layer 3. Therefore, the coating composition is so prepared that the lubricating layer 3 contains the liquid 5 and the solid particles 7 in amounts at such a ratio as to exhibit excellent sliding property.

It is, therefore, desired that the solid particles 7 are dispersed in the coating composition in an amount of 0.01 to 10 parts by mass and, specifically, 0.1 to 5 parts by mass per 100 parts by mass of the liquid 5 used as the dispersion medium. When the lubricating layer 3 is formed by using the coating composition that contains the liquid 5 and the solid particles 7 in amounts as described above, the ratio of the liquid 5 and the solid particles 7 is almost all reflected in the lubricating layer 3. Therefore, rolling property is exhibited to a sufficient degree due to the rolling of solid particles 7 and, besides, the liquid 5 is stably held by the solid particles 7, accounting for the expression of excellent sliding effect.

Figure 3A:
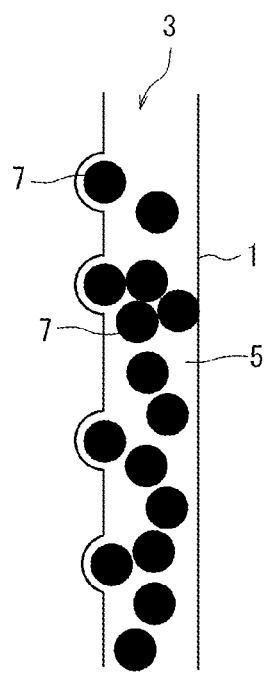

For instance, if the amount of the solid particles 7 is larger than the above range, the solid particles 7 tend to be aggregated as shown in the model view of FIG. 3A and the sliding effect is not exhibited to a sufficient degree.

Figure 3B:
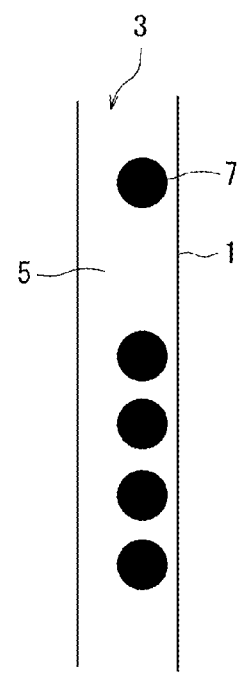

Further, if the amount of the solid particles 7 is smaller than the above range (i.e., if the amount of the liquid 5 is large), the sliding effect based on the rolling of solid particles 7 is likely to become insufficient as shown in the model view of FIG. 3B. Moreover, if the base material 1 is a container, the solid particles 7 cannot be sufficiently held on the bottom portion of the container. Therefore, the solid particles 7 are liable to be extinguished and, as a result, the effect becomes insufficient for suppressing the adhesion and stay of the content on the bottom portion of the container.

The above-mentioned coating composition of the present invention can be easily prepared by mixing the liquid 5 (dispersion medium) and the solid particles 7 in amounts as described above and stirring the mixture so that the solid particles 7 are homogeneously dispersed. The coating composition is usually applied onto the surface of the base material 1 in an amount of 1.0 to 6.2 mg/cm$^2$. It is, therefore, desired that the lubricating layer 3 is formed on the surface of the base material, usually, in an amount as described above. If the amount thereof is too small, the lubricating layer 3 fails to exhibit the sliding effect to a sufficient degree. If the amount thereof is too large, on the other hand, the lubricating layer 3 may split off and its amount becomes unstable. Besides, rolling property due to the solid particles 7 are less exhibited.

The coating composition has a viscosity adapted to have it applied, and can be applied by means that meets the form of the surface of the base material 1, such as spraying, dipping, using a roller or a knife coater. Among them, however, the spraying is best suited as it makes it easy to apply the coating composition irrespective of the form of the surface of the base material 1 and, besides, it makes it easy to set the amount of application (or the amount of the lubricating layer 3) within the above-mentioned range of amount.

With the structure forming the lubricating layer 3 on the surface of the base material 1 by using the coating composition of the present invention, the lubricating layer 3 exhibits excellent sliding property to viscous fluid substances having viscosities (25° C.) of not less than 100 mPa·s. Therefore, the structure can be desirably used, specifically, in the form of a packing material such as container or lid member.

Specifically, with the structure being used as a container while forming the lubricating layer 3 on the inner surface thereof by suitably selecting the kinds of the liquid 5 and the solid particles, the effect is exhibited for preventing the content from adhering or staying on the bottom portion. Specifically, if the lubricating layer 3 is formed by using the above-mentioned oily liquid, the structure of the invention is most desirably used as a bottle for containing viscous contents such as mayonnaise, ketchup, aqueous paste, honey, various sauces, mustard, dressing, jam, chocolate syrup, cosmetic such as milky lotion, liquid detergent, shampoo, rinse, etc.

EXAMPLES

The invention will now be described by way of the following Experimental Examples.

Described below are the container (base material 1), lubricating liquids (liquids 5 constituting the lubricating layer 3) and contents used in Experimental Examples.

<Container>
(1) Sheet Members

As sheet members, there were used a multi-layer sheet of a width of 75 mm and a length of 50 mm cut out from a multi-layer bottle that will be described later, and a glass plate of a width of 75 mm and a length of 50 mm.

(2) Bottle

There was used a directly blow-formed multi-layer bottle having a multilayer structure of the following layer constitution and having a capacity of 400 g.

Inner layer: low-density polyethylene resin (LDPE)
Intermediate layer: ethylene-vinyl alcohol copolymer (EVOH)
Outer layer: low-density polyethylene resin (LDPE)
Adhesive layers (among the inner layer, intermediate layer and outer layer): acid-modified polyolefin <Lubricating Layer>
(1) Liquid (Dispersion Medium) for Forming the Lubricating Layer Edible oil A:
Salad oil to which medium-chain fatty acid is added (viscosity: 33 mPa·(25° C.), angle of contact: 18 degrees).

Edible Oil B:
Salad oil to which no medium-chain fatty acid is added (viscosity: 80 mPa·s (25° C.), angle of contact: 18 degrees)

(2) Solid Particles
Rice wax.
Cellulose.

Coating compositions in which solid particles of specified particle sizes were dispersed were prepared by mixing solid particles into the above-mentioned liquids (dispersion media) used in Experimental Examples as shown in Table 1 or 2 and stirring them together. The coating compositions were uniformly applied in specified amounts onto the sheet materials of the containers and onto the inner surfaces of the bottles;

<Measurements>
Particle Size of the Solid Particles;

Solid particles were mixed in an amount of 1% into the edible oil A, and the distribution of particle sizes was measured by the laser diffraction light scattering method by using a particle size distribution measuring apparatus (LA-300 manufactured by HORIBA, Ltd). A median value thereof was regarded to be a particle size.

Angle of Contact;

The inner surface of the container that is the multi-layer sheet of the sheet member was left to face upward, and 10 mg of an edible oil used as the lubricating liquid was dropped thereon. The angle of contact of the dispersion medium (liquid 5) was measured by using an instrument for measuring contact angles (Drop Master 700 manufactured by Kyowa interface Science Co., Ltd) at 20° C., 50% RH.

Viscosity of the Dispersion Medium;

A liquid was introduced into a beaker, and a spindle and a guard of a B-type digital viscometer were put into the liquid. While maintaining the temperature at 25° C., the spindle was turned at 10 rpm for one minute to measure the viscosity.

<Content>

An egg (50 g), 15 cc of vinegar and 2.5 cc of salt were mixed together and to which 150 cc of edible oil was, further, added to prepare a mayonnaise-like food for experiment. In Examples and Comparative Examples, the contents were prepared in required amounts and were used.

By using the contents of Experimental Examples, further, the sliding properties (sliding properties of the sheet members) and sliding properties of the bottom portions (bottles) were evaluated in a manner as described below.

<Evaluating the Sliding Properties>

Figure 4:
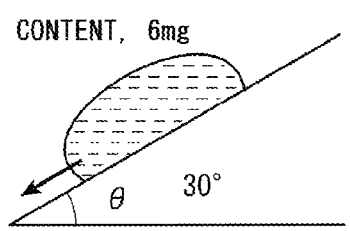
FIG. 4 is a view illustrating conditions for testing the sliding property.

The coating solution was applied to the sheet member which was thereafter held at an angle of 30 degrees (see FIG. 4). 6 Milligrams of the mayonnaise-like food was dropped thereon, and the time was measured until it moved 5 cm. The sliding properties were evaluated on the following basis.

⊚: Moved in less than 14 seconds.
○: Moved in not less than 14 seconds but less than 18 seconds.
Δ: Moved in not less than 18 seconds.
X: Not slipped down in not less than 60 seconds.

<Evaluating the Sliding Properties on the Bottom Portion of the Containers>

A spray nozzle was inserted in the bottle up to the bottom thereof and was pulled up while spraying the coating composition (coating solution) so that the coating solution was applied to the whole side wall surfaces starting froth the bottom portion of the bottle. Into the bottle having the liquid film with the solid particles dispersed therein formed on the inner surface thereof, 400 g of the content or the mayonnaise-like food was introduced in a customary manner. The mouth portion of the bottle was heat-sealed with an aluminum foil and was sealed with a cap to obtain a filled bottle.

The bottle filled with the content was stored at 23° C. for one week. The bottle stored for one week was pressed on its body portion, and the content was squeezed out up to its last drip through the mouth portion of the bottle. Thereafter, the air was introduced into the bottle to restore its original shape.

Next, the bottle was inverted (mouth portion down) and was stored for one hour. Thereafter, the body wall of the bottle was measured in regard to what extent the content has slid down (to what extent the content has no longer been adhered to the body wall portion). The content slide-down ratio was calculated in compliance with the following formula.

Content slide-down ratio (%)=(surface area on which the content is sliding down/surface area of the body wall of the bottle)×100

From the content slide-down ratios calculated above, the sliding properties were evaluated on the following basis.

○: The content slide-down ratio is not less than 90%.
Δ: The content slide-down ratio is not less than 50% but is less than 90%.
X: The content r slide-down ratio is less than 50%.

Experimental Examples 1 to 6

By using the multi-layer sheet as the material for forming the inner surface of the packing material, coating compositions obtained by dispersing the rice wax (particle size of 100 μm) in the edible oil A (dispersion medium) were applied thereon at solid particle dispersion ratios and in amounts as shown in Table 1, and the sliding properties were evaluated.

Experimental Example 7

By using the multi-layer sheet as the material for forming the inner surface of the packing material, a coating composition was applied thereon in the same manner as in Example 1 but changing the solid particles into the rice wax (particle size of 50 μm) at a solid particle dispersion ratio and in an amount as shown in Table 1, and the sliding property was evaluated.

Experimental Example 8

By using the multi-layer sheet as the material for forming the inner surface of the packing material, a coating composition was applied thereon in the same manner as in Example 1 but changing the solid particles into the rice wax (particle size of 250 μm) at a solid particle dispersion ratio and in an amount as shown in Table 1, and the sliding property was evaluated.

Experimental Example 9

By using the multi-layer sheet as the material for forming the inner surface of the packing material, a coating composition was applied thereon in the same manner as in Example 1 but changing the lubricating liquid into the edible oil B at a solid particle dispersion ratio and in an amount as shown in Table 1, and the sliding property was evaluated.

Experimental Example 10

By using the multi-layer sheet as the material for forming the inner surface of the packing material, a coating composition was applied thereon in the same manner as in Example 1 but changing the solid particles into the cellulose (particle size of 120 μm) at a solid particle dispersion ratio and in an amount as shown in Table 1, and the sliding property was evaluated.

Experimental Example 11

By using the glass plate as a material for forming the inner surface of the packing material, the coating composition was applied thereon in the same manner as in Example 1 at a solid particle dispersion ratio and in an amount as shown in Table 1, and the sliding property was evaluated.

Experimental Example 12

By using the multi-layer bottle as the packing material, a coating composition obtained by dispersing the rice wax (particle size of 100 μm) in the edible oil A was applied thereon at a solid particle dispersion ratio and in an amount as shown in Table 1, and the sliding property on the bottom portion was evaluated.

Experimental Example 13

By using the multi-layer bottle as the packing material, a coating composition obtained by dispersing the rice wax (particle size of 50 μm) in the edible oil A was applied thereon at a solid particle dispersion ratio and in an amount as shown in Table 1, and the sliding property on the bottom portion was evaluated.

Experimental Example 14

By using the multi-layer bottle as the packing material, a coating composition obtained by dispersing the rice wax (particle size of 250 μm) in the edible oil A was applied thereon at a solid particle dispersion ratio and in an amount as shown in Table 1, and the sliding property on the bottom portion was evaluated.

Experimental Examples 15 to 16

By using the multi-layer sheet as the material for forming the inner surface of the packing material, coating compositions obtained by dispersing the rice wax (particle size of 100 μm) in the edible oil A were applied thereon at solid particle dispersion ratios and in amounts as shown in Table 2, and the sliding properties were evaluated.

Experimental Example 17

By using the multi-layer sheet as the material for forming the inner surface of the packing material, a coating composition obtained by dispersing the rice wax (particle size of 350 μm) in the edible oil A was applied thereon at a solid particle dispersion ratio and in an amount as shown in Table 2, and the sliding property was evaluated.

Experimental Example 18

By using the multi-layer sheet as the material for forming the inner surface of the packing material, the edible oil A was applied thereon in an amount as shown in Table 2, and the sliding property was evaluated.

Experimental Example 19

By using the multi-layer sheet as the material for forming the inner surface of the packing material, the rice wax was applied thereon in an amount of 2.5 g, the edible oil A was applied thereon in an amount as shown in Table 2, and the sliding property was evaluated.

Experimental Example 20

By using the multi-layer sheet as the material for forming the inner surface of the packing material, the sliding property was evaluated without applying the coating composition.

Experimental Example 21

By using the multi-layer bottle as the packing material, the edible oil A was applied thereon, and the sliding property on the bottom portion was evaluated.

Experimental Example 22

By using the multi-layer bottle as the packing material, the sliding property on the bottom portion was evaluated without applying the coating composition.

Tables 1 and 2 show the results of evaluation in the above Experimental Examples.

In Tables 1 and 2, Ex. stands for Experimental Examples.

TABLE 1

| | | Coating solution | | Amount | | Evaluation | |
| | | | | | | Sliding | |
| | Material | Lubricating liquid | Solid particles | applied (mg/cm²) | *1 | Sliding down | property on bottom |
| --- | --- | --- | --- | --- | --- | --- | --- |
| Ex. 1 | multi-layer sheet | edible oil A | *2 (*4, 100 μm) | 2.4 | 3 | ◉ | — |
| Ex. 2 | ↑ | ↑ | ↑ | 1 | 3 | ○ | — |

TABLE 1-continued

| | | Coating solution | | Amount | | Evaluation | |
| | | | | | | Sliding | |
| | Material | Lubricating liquid | Solid particles | applied (mg/cm²) | *1 | Sliding down | property on bottom |
|---|---|---|---|---|---|---|---|
| Ex. 3 | ↑ | ↑ | ↑ | 6.2 | 3 | ○ | — |
| Ex. 4 | ↑ | ↑ | ↑ | 2.4 | 0.01 | ○ | — |
| Ex. 5 | ↑ | ↑ | ↑ | 2.4 | 5 | ◉ | — |
| Ex. 6 | ↑ | ↑ | ↑ | 2.4 | 10 | ○ | — |
| Ex. 7 | ↑ | ↑ | *2 (*4, 50 μm) | 2.4 | 3 | ○ | — |
| Ex. 8 | ↑ | ↑ | *2 (*4, 250 μm) | 2.4 | 3 | ○ | — |
| Ex. 9 | ↑ | edible oil B | *2 (*4, 100 μm) | 2.4 | 3 | ○ | — |
| Ex. 10 | ↑ | edible oil A | *3 (*4, 120 μm) | 2.4 | 3 | ○ | — |
| Ex. 11 | glass plate | ↑ | *2 (*4, 100 μm) | 2.4 | 3 | ○ | — |
| Ex. 12 | multilayer bottle | ↑ | ↑ | 2.4 | 3 | — | ○ |
| Ex. 13 | ↑ | ↑ | *2 (*4, 50 μm) | 2.4 | 3 | — | ○ |
| Ex. 14 | ↑ | ↑ | *2 (*4, 250 μm) | 2.4 | 3 | — | ○ |

*1: Amount of solid particles dispersed (g/100 g of liquid),
*2: rice wax,
*3: cellulose,
*4: particle size

TABLE 2

| | | Coating solution | | Amount | | Evaluation | |
| | | | | | | Sliding | |
| | Material | Lubricating liquid | Solid particles | applied (mg/cm²) | *1 | Sliding down | property on bottom |
|---|---|---|---|---|---|---|---|
| Ex. 15 | multi-layer sheet | edible oil A | *2 (*3, 100 μm) | 10 | 3 | Δ | — |
| Ex. 16 | ↑ | ↑ | ↑ | 2.4 | 20 | Δ | — |
| Ex. 17 | ↑ | ↑ | *2 (*3, 350 μm) | 2.4 | 3 | Δ | — |
| Ex. 18 | ↑ | ↑ | — | 2.4 | — | Δ | — |
| Ex. 19 | ↑ | edible oil A was applied after rice wax has adhered | | 2.4 | — | Δ | — |
| Ex. 20 | ↑ | — | — | — | — | X | — |
| Ex. 21 | bottle | edible oil A | — | 2.4 | — | — | Δ |
| Ex. 22 | ↑ | — | — | — | — | — | X |

*1: Amount of solid particles dispersed (g/100 g of liquid),
*2: rice wax,
*3: particle size Upon forming the lubricating layer which contains the liquid and solid particles on the inner surfaces of the sheet members and the bottles, improved sliding property is exhibited to the content. It will, therefore, be learned that excellent sliding property is exhibited to the content.

Experimental Examples 23 to 26

In compliance with the results of the above Experimental Examples, the coating compositions containing the solid particles (rice wax) and the dispersion medium (edible oil) in amounts as shown in Table 3 were applied each in an amount of 0.6 cc onto the glass members (preparates) and were allowed to cover the whole surfaces thereof. Thereafter, the preparates were held vertically for 30 seconds and were returned to the horizontal state to measure the remaining ratios (%) of the coating solutions per the areas. The results were as shown in Table 3

TABLE 3

| | Ratio of solid particles dispersed (g/100 g of liquid layer) | Remaining ratio (%) |
|---|---|---|
| Ex. 23 | 0 | 2 |
| Ex. 24 | 0.1 | 9 |
| Ex. 25 | 1 | 39 |
| Ex. 26 | 10 | 85 |

As will be obvious from Table 3, the higher the ratio of the solid particles in the coating composition, the higher the remaining ratio of the lubricating layer.

Though not shown in Table, if the ratio of the solid particles is too high in the coating composition, the solid particles may aggregate together and may hinder the content from sliding down or may infiltrate into the content. Therefore, the ratio thereof (or the amount of the solid particles per 100 g of the liquid) is, desirably, 0.01 to 10% and, specifically, 0.1 to 5%.

DESCRIPTION OF REFERENCE NUMERALS

1: base material
3: lubricating layer

5: liquid
7: solid particles
10: bottle
11: neck portion
13: shoulder portion
15: body wall

The invention claimed is:

1. A coating composition for forming a lubricating layer on an inner surface of a container so as to impart improved sliding properties between a content of the container and said inner surface, the coating composition consisting of an edible oil as a dispersion medium and solid particles dispersed in the edible oil, and said edible oil having an angle of contact (20° C.) of not more than 45° relative to the inner surface of the container and a viscosity (25° C.) of not more than 100 mP·s, and said solid particles being formed of a rice wax or a cellulose having a melting point of not lower than 40° C. and having a particle size of 5 to 300μm.

2. The coating composition according to claim 1, wherein the solid particles are dispersed in an amount of 0.01 to 20 parts by mass per 100 parts by mass of the dispersion medium.

3. A method of forming a lubricating layer on an inner surface of a container comprising a base material so as to impart improved sliding property to fluid substances by spraying the coating composition of claim 1 onto the inner surface of the container in an amount of 1.0 to 6.2 mg/cm².

4. The method according to claim 3, wherein the inner surface of the container comprises a packing material for containing fluid substances, and the coating composition is sprayed onto the inner surface of the container with which the fluid substance comes in contact.

5. A structure having a lubricating layer formed on an inner surface of a container by applying the coating composition of claim 1 thereon so as to impart improved sliding property to fluid substances, the lubricating layer being formed of the edible oil and solid particles.

* * * * *